United States Patent
Christopher et al.

(10) Patent No.: US 8,549,187 B1
(45) Date of Patent: Oct. 1, 2013

(54) SYSTEM AND METHOD OF MAC ADDRESS ASSIGNMENT USING IP ADDRESSES

(75) Inventors: Samvinesh Christopher, Suwanee, GA (US); Varadachari Sudan Ayanam, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 13/566,305

(22) Filed: Aug. 3, 2012

(51) Int. Cl.
*G06F 3/00* (2006.01)
*G06F 15/177* (2006.01)

(52) U.S. Cl.
USPC ............................................. 710/9; 709/220

(58) Field of Classification Search
None
See application file for complete search history.

(56) References Cited

U.S. PATENT DOCUMENTS

| | | | |
|---|---|---|---|
| 2008/0059623 A1* | 3/2008 | Yang et al. | 709/223 |
| 2008/0212591 A1* | 9/2008 | Wu et al. | 370/395.21 |
| 2009/0049199 A1* | 2/2009 | Kuik et al. | 709/245 |
| 2012/0084408 A1* | 4/2012 | Ayanam et al. | 709/220 |

* cited by examiner

*Primary Examiner* — Hyun Nam
(74) *Attorney, Agent, or Firm* — Morris, Manning & Martin, LLP; Tim Tingkang Xia, Esq.

(57) ABSTRACT

A hypervisor is described herein that hosts a virtual machine (VM) having a virtual network interface controller (VNIC). The hypervisor is configured to construct a MAC address for the VNIC by combing a organizationally unique identifier (OUI) preconfigured for the hypervisor, the last two bytes of the IP address of the hypervisor, and a unique byte generated for the VNIC.

27 Claims, 3 Drawing Sheets

SYSTEM AND METHOD OF MAC ADDRESS ASSIGNMENT USING IP ADDRESSES

FIELD

The present disclosure relates generally to computer networking, and in particular, to computer systems that assign MAC addresses using IP addresses.

BACKGROUND

With the emergence of server partitioning, a single server can be made to run as if it were two or more servers. Server partitioning offers a number of advantages to information technology (IT) departments of growing businesses. For example, system administrators can consolidate multiple applications into a single server box, thereby centralizing management, saving space, and potentially lowering IT costs.

As virtualization and server partitioning become increasingly common, the level of virtualization, i.e., the number of logical systems concurrently executing in each server, will continue to increase. For example, in a hypervisor hosting a number of virtual machines, each virtual machine typically requires its own network connection. A network connection is typically established through a network interface device, for example, a network interface controller (NIC) or network adapter. However, providing each virtual machine with its own Ethernet adapter can be very expensive because of the cost of network adapter cards. Furthermore, Input/Output (IO) enclosures required to house the adapters may take valuable space on the server.

One solution is to develop a virtualized network interface controller which is capable of supporting a virtual machine (VM). A virtualized network interface controller can be provided in a virtual machine, and a guest operating system run by the virtual machine may use a network interface adapter to access the virtual network interface controller. Each network interface adapter requires a unique Media Access Control (MAC) address. Traditionally, network interface controllers had MAC addresses permanently burned into the adapter, providing a unique MAC address for each physical port of the controller.

In virtual machine environments, the hypervisor will control the physical devices, and the virtual machines will be provided virtual devices. For communicating to the VM, the virtualized network interface controller requires a unique MAC address. The OUI part of the MAC is normally assigned to the hypervisor manufacturer by IEEE. For example, for XEN hypervisor the OUI is "00:16:3E". Assigning a unique NIC part of the MAC address is a challenging task, especially in a large network with a significant number of virtual machines.

Therefore, an unaddressed need exists in the art to address the aforementioned deficiencies and inadequacies.

SUMMARY

Certain aspects of the present disclosure are directed to a computing device. The computing device includes a hypervisor running on a processor, the hypervisor being assigned a first IP address, the hypervisor hosting a first virtual machine (VM) having a first virtual network interface controller (VNIC). The hypervisor is configured to obtain an OUI part, the OUI part being a organizationally unique identifier (OUI) preconfigured for the hypervisor; obtain an IP part, the IP part being the last two bytes of the first IP address, obtain a first VNIC part, the first VNIC part being a byte generated for the first VNIC, construct a first MAC address by combing the OUI part, the IP part, and the first VNIC part, and assign the first MAC address to the first VNIC.

In certain embodiments, the hypervisor provides N VNICs, N being an integer greater than 1. The hypervisor is configure to generate N VNIC parts that each are a single byte and that are unique to each other, construct N MAC addresses, each of the N MAC address being a combination of the OUI part, the IP part, and a respective, different one of the N VNIC parts, and assign each of the N MAC addresses to a respective, different one of the N VNICs.

In certain embodiments, the hypervisor is configured to determine whether the prefix length of the first IP address is 16 or greater, and obtain the IP part in response to a determination that the prefix length of the IP address is 16 or greater.

In certain embodiments, the hypervisor is configured to determine whether another VM that has not been provided a MAC address has been created, construct another MAC address by combing the OUI part, the IP part, and another VNIC part, the another VNIC part being a byte uniquely generated, and assign the another MAC address to a VNIC of the another VM.

Certain aspects of the present disclosure are directed to a method for dynamically assigning MAC addresses to virtual network interface controllers (VNICs) of a hypervisor running on a VNIC computing device having a processor, the hypervisor hosting a first virtual machine having a first VNIC, the hypervisor being assigned a first IP address. The method includes obtaining an OUI part, at the hypervisor executed by the processer, wherein the OUI part is a organizationally unique identifier (OUI) preconfigured for the hypervisor; obtaining an IP part, the IP part being the last two bytes of the first IP address; obtaining a first VNIC part, the VNIC part being a byte generated for the first VNIC; constructing a first MAC address by combing the OUI part, the IP part, and the first VNIC part; and assigning the first MAC address to the first VNIC.

Certain aspects of the present disclosure are directed to a non-transitory computer readable medium storing instructions, when executed, causing a computing device to execute a MAC address assignment process, a hypervisor running on the computing device, the hypervisor hosting a first virtual machine having a first virtual network interface controller (VNIC), the hypervisor being assigned a first IP address. The instructions include obtaining an OUI part, at the hypervisor executed by a processer, wherein the OUI part is a organizationally unique identifier (OUI) preconfigured for the hypervisor; obtaining an IP part, the IP part being the last two bytes of the first IP address; obtaining a first VNIC part, the VNIC part being a byte generated for the first VNIC; constructing a first MAC address by combing the OUI part, the IP part, and the first VNIC part; and assigning the first MAC address to the first VNIC.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
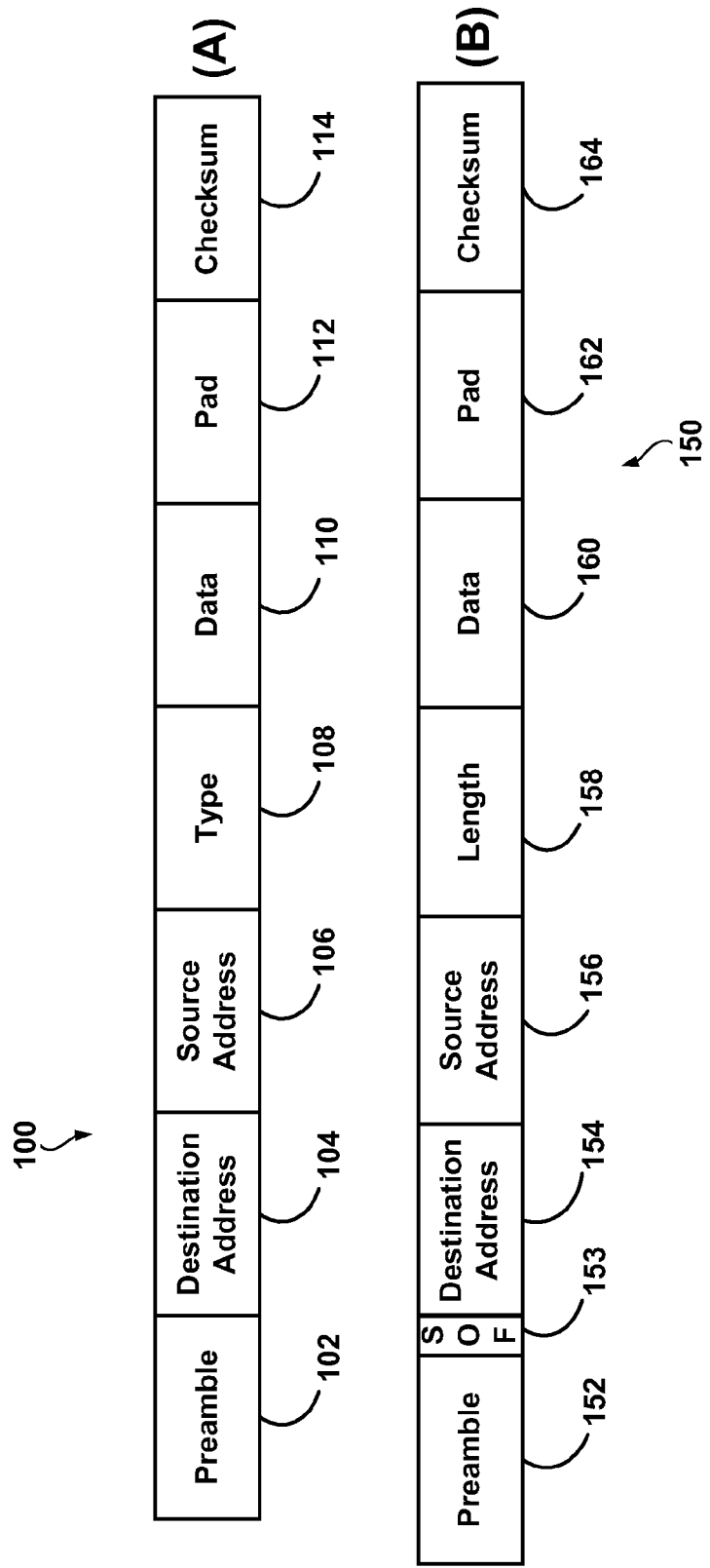
FIGS. 1A-B schematically illustrate frame formats in accordance with Ethernet and IEEE 802.3.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1A illustrates the frame format 100 in accordance with Ethernet. FIG. 1B illustrates the frame format 150 in accordance with IEEE 802.3. In the Ethernet format, the data frame has preamble 102, destination address 104, source address 106, type 108, data 110, pad 112, and checksum 114 fields. In the IEEE format, the data frame has preamble 152, start of frame 153, destination address 154, source address 156, length 158, data 160, pad 162, and checksum 164 fields. Since Ethernet and IEEE 802.3 are identical except for some minor differences, the present disclosure uses the terms Ethernet and IEEE 802.3 interchangeably, unless otherwise noted.

The destination address 104, 154 and the source address 106, 156 are each 6 bytes long. The source addresses 106, 156 are globally unique to ensure that no two stations anywhere in the world would have the same address. The idea is that a new station can uniquely address any other station by just leaving the right 48 bit number. To do this, the first 3 bytes of the address field are used for an organizationally unique identifier (OUI). Values for this field are assigned by IEEE and indicate a manufacturer. Manufacturers are assigned blocks of $2^{24}$ addresses. The manufacturer assigns the last 3 bytes of the addresses and programs the complete address into a network interface controller (NIC) before it is sold.

Figure 2:
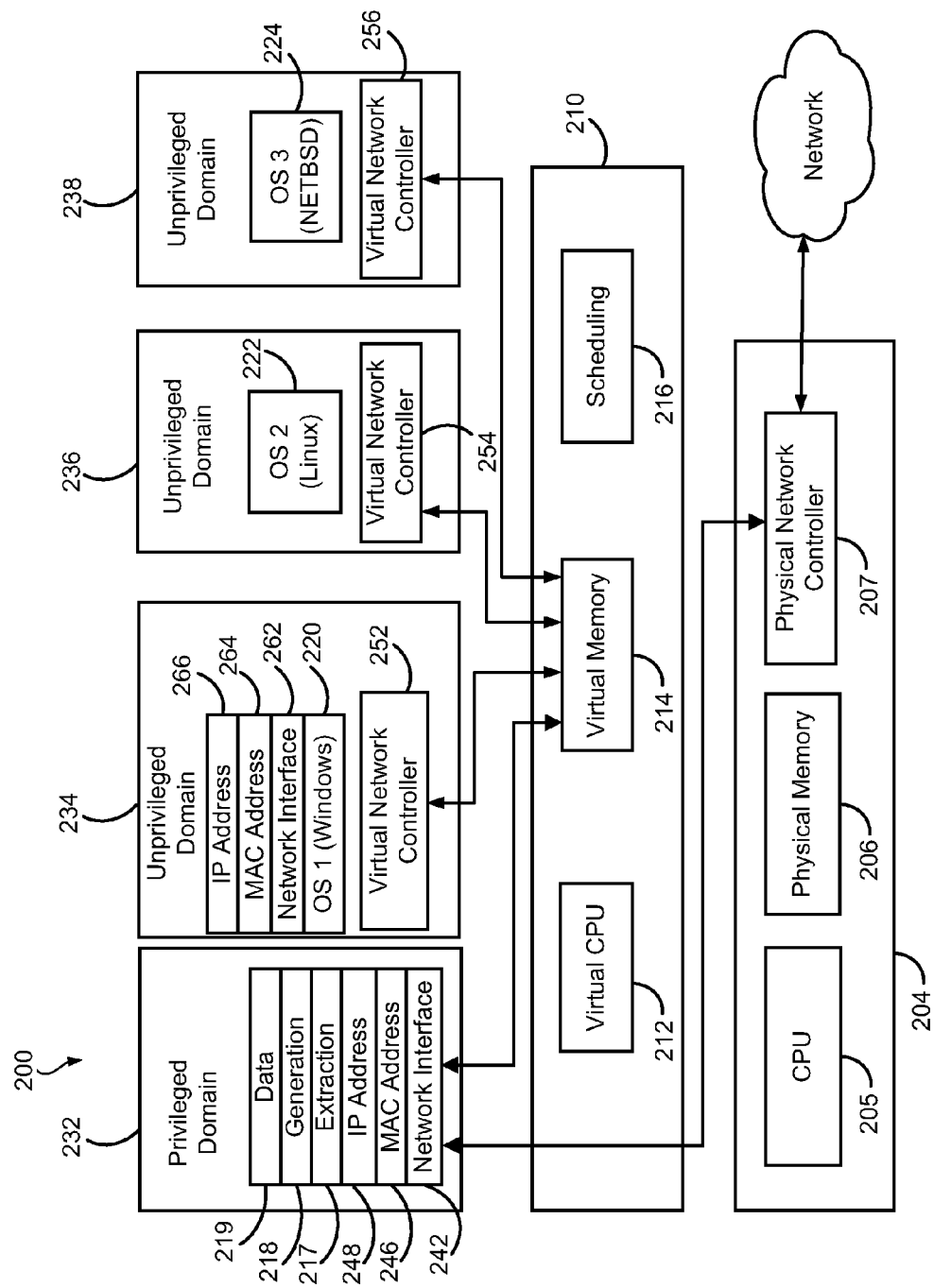
FIG. 2 schematically illustrates a computer system in which a hypervisor hosting multiple unprivileged domains or virtual machines in accordance with certain embodiments of the present disclosure.

FIG. 2 illustrates a computer system 200 in which a hypervisor 210 hosting multiple unprivileged domains or virtual machines 234, 236, 238 in accordance with certain embodiments of the present disclosure. Virtualization allows a number of virtual servers (such as an operating system 220, 222, 224) to be consolidated into a single physical machine 204, without losing the security gained by having completely isolated environments. Virtualization makes it relatively easy to migrate virtual machines from one physical computer to another, making it easy to keep redundant virtual server images synchronized across physical machines. A virtual machine gets certain features, such as cloning, at a very low cost. A virtual machine can be migrated to another host if the hardware begins to experience faults, or if an upgrade is scheduled. It can then be migrated back when the original machine is working again.

In certain embodiments, a hypervisor 210 is running on the computer system 200. Stated in a simplified way, the hypervisor 210 runs on top of the hardware including the CPU 205 and the physical memory 207. In certain embodiments, the hypervisor 210 can be stored or pre-built in a flash ROM of the computer system 200. Alternatively, the hypervisor can be stored or pre-built in the hard drive of the computer system 200. The hypervisor has, among other thing, virtual CPUs 212, virtual memories 214, and scheduling services 216, an extraction module 217, a generation module 218, and a data module 219 (which will be described in detail below). The hypervisor 210 hosts virtual machines or domains 234, 236, 238, which encapsulate a complete running virtual environment. The hypervisor 210 typically runs a domain or virtual machine 232 having higher security privilege, which is sometimes referred to as a privileged domain and, optionally, one or more domains 234, 236, 238 having lower security privilege, which are sometimes referred to as unprivileged domains. In certain embodiments, a process in the privileged domain 232 typically can have access to hardware such as physical devices of the computer system and their drivers, while guests run by the unprivileged domains 340, 350 typically cannot.

In the example shown in FIG. 2, the hypervisor 210 provides a privileged domain 232. The hypervisor 210 itself may not include any device drivers, nor a user interface. These can all be provided by the system and user space tools running in the privileged domain 232 as guests. The privileged domain guest can be, but not necessarily is, operating systems such as WINDOWS, LINUX, NETBSD, and SOLARIS. Common tasks performed by the privileged domain guest are to handle devices. This guest runs at a higher level of privilege than others, and can access the hardware. For this reason, it is vital that the privileged guest be properly secured. In certain embodiments, the hypervisor 210 does not necessarily rely on a privileged domain guest to provide those functions. The hypervisor itself can provide those functions such as device drivers.

One skilled in the art would appreciate that the hypervisor 210 can also run on two CPUs, four CPUs, eight CPUs, or any suitable number of CPUs. The hypervisor 210 can be of various types and designs, such as XEN, MICROSOFT HYPER-V, VMWARE ESX. The hypervisor 210 can emulate one or more virtual machines or domains 234, 236, 238. An operating system 220, 222, 224 can be installed in a virtual machine 234, 236, 238. The operating system 220, 222, 224 may not realize that it is running on virtual machine and may perceive that it is running on a physical machine. The operating systems 220, 222, 224 running on the virtual machine 234, 236, 238 can host one or more application programs.

The computer system 200 includes the physical network controller 207. In certain embodiments where the hypervisor 210 utilizes a privileged domain 232, the privileged domain 232 runs a network interface (or driver, adapter) that is communicative with the physical network controller 242. In certain embodiments, the network interface 242 can be part of the hypervisor 304. The physical network controller 207 is assigned an MAC address as discussed above. The network interface 242 in the privileged domain can be associated with the MAC address 246 of the physical network controller and uses that MAC address to send and receive Ethernet (or IEEE 802.3) frames. The physical network interface controller 207 can also include a network program for processing network communications sent to and from the network controller 207. The network program forwards network packets sent from a remote computer addressed to the MAC address 246 to the network interface 242 running in the privileged domain 232 or as part of the hypervisor 210. The MAC address 246 assigned to the physical network controller 207 can be considered as the MAC address of the hypervisor. The network interface 242 is the destination of network frames addressed to the MAC address 246.

In certain embodiments, the hypervisor can request an IP address, for example from a DHCP in the network, for the network interface 242 in the privileged domain. The IP address is associated with the MAC address of the physical network controller. The IP address 248 identifies the network interface 242 on the TCP/IP network so that network packets may be routed to and from the network interface 242 in the privileged domain 232 using the IP address 248. The IP address 248 may also be allocated a domain name that may be utilized in a URL to identify one or more Web pages available from a Web server application program.

In certain embodiments, the hypervisor 210 hosts one or more unprivileged domains 234, 236, 238. Each of the unprivileged domains 234, 236, 238 can run a guest, such as an operating systems. For example, the first unprivileged domain 234, the second unprivileged domain 236, and the third unprivileged domain 238 can run WINDOWS, LINUX, and NETBSD operating systems respectively. An unprivileged domain 234, 236, 238 can provide a virtual network controller 252, 254, 256. From the perspective of a guest run in the unprivileged domain 234, 236, 238, the virtual network controller 252, 254, 256 appears as a physical network controller to the guest. The guest, such as the operating system 220, 222, 224 can utilize the virtual network controller 252, 254, 256 to access the network. For example, the operating system 220 in the unprivileged domain 234 can have a network interface for communicating with the virtual network controller 252. In order to support the operating system 220 run in the unprivileged domains 234 to access an Ethernet network and/or IP network, the virtual network controller 252 can be assigned a MAC address 264 and/or IP address 266.

User can manually assign a unique MAC address for each virtual network interface controller 252, 254, 256 on every virtual machine (or unprivileged domain) 234, 236, 238. For small environments this may be the easiest approach. For medium to large environments, however, this approach requires intensive manual work and can be highly error-prone. For example, it is required to maintain a log of MAC addresses and VMs because VMs can be migrated from one physical machine to another and has to be manually reassigned another MAC address.

In certain embodiments, the hypervisor 210 can be configured to assign a MAC address 264 to a virtual network controller 252. The hypervisor typically is assigned an OUI by IEEE, i.e. the OUI part of a MAC address. For example, the XEN hypervisor is assigned an OUI of "00:16:3E". The hypervisor can generate a MAC address using that OUI as the first 3 bytes of the MAC address. The hypervisor can generate, for example randomly, the last 3 bytes of the MAC address. Each hypervisor can have a mechanism that takes necessary steps to generate mutually unique MAC addresses. For example, the hypervisor 210 can generate and assign a MAC address of "00:16:3E:00:00:12" to the virtual network controller 252 of the first unprivileged domain 234. This approach requires no manual intervention and can work easily for small to large networks (up to $255^3$ VMs).

Without a carefully designed scheme, there is a high probability of duplicated MAC addresses across different hypervisors on the same network. For example, two different hypervisors each may assign the same MAC address to a respectively hosted VM. This can result in complete network disturbances. Even though there are $255^3$ unique addresses that can be generated, the probability of duplication cannot be ignored. It has been suggested that the probability of duplications is 1% for a network with 600 VMs, 3% for a network with 1000 VMs, and 95% for a network with 10,000 VMs. So even in cases of small networks, there is always a possibility of duplication. In large networks such as datacenters, there may be multiple duplications.

The hypervisor 210 typically is in a network and utilizes the Internet protocol (IP) as the network layer protocol. Currently there are two versions of IP, i.e., IPv4 and IPv6. An IP datagram or packet has a header part and a body or payload part. The structure of the packets of different versions are somewhat different. The header of an IP packet includes a source address and the destination address. For example, the IPv4 defines a 32 bit address. IP addresses are hierarchical, unlike Ethernet addresses. Each 32-bit address is compromised of a variable length network portion in the top bits and a host portion in the bottom bits. The network portion has the same value for all hosts of a single network, such as an Ethernet LAN. This means that a network corresponds to a contiguous block of IP addresses. This block can be identified by the network portion of the IP address, which is typically referred to as the prefix.

The prefix length cannot be inferred from the IP address alone. Typically, routing protocols must carry the prefixes to routers. Sometimes prefixes are simply described by their length, and written in a notation as the length following a "/" sign, such as "/16". The length of the prefix corresponds to a binary mask of 1s in the network portion, which is typically referred to as a subnet mask. The network portion can be extracted from an IP address by execute a logical AND operation of the subnet mask and the IP address.

The hypervisor 210 in the local network can be assigned, for example by a DHCP server, either a public IP address or a private IP address. Private IP addresses typically refer to addresses that are in the three reserved ranges: 10.0.0.0-10.255.255.255/8 (16,777,216 hosts), 172.16.0.0-172.31.255.255 (1,048,576 hosts), 192.168.0.0-192.168.255.255/16 (65,536 hosts). The private IP addresses are to be used in an internal network, and typically no packets containing these addresses may appear on the Internet itself. The private IP addresses of IP packets typically are translated to public IP addresses and port numbers by devices implementing Network Address Translation (NAT).

For a local network assigning devices IP addresses that each have a prefix whose length is 16 or greater, the last two bytes of any of the IP addresses are unique to or different from the last two bytes of any other IP addresses used in the local network, because a properly assigned IP address must be able to uniquely identify only one particular device in the local network. In certain embodiments, a hypervisor 210 in such a local network can utilize these features of the IP addresses and generate a unique MAC address for each virtual machine 234, 236, 238 hosted by the hypervisor 210.

In certain embodiments, the hypervisor 210 can determine the prefix and/or the length of the prefix of the IP address assigned to itself based on the configuration of the hypervisor. For example, the hypervisor can use the subnet mask property of the network interface to determine whether the length of the prefix is 16 or greater. In certain embodiments, the hypervisor may inquire the assigning DHCP server and obtain such information from the DHCP server.

The hypervisor employs a necessary mechanism, such as the extraction module 217, to extract the last 2 bytes of its IP address, which are used as an IP part of a MAC address. For example, if the hypervisor 210 is assigned a public IP address of 194.24.7.255/21, (i.e. 0xC21807FF), the hypervisor 210 extracts the last 2 bytes, which are 0x07FF, as the IP part. Similarity, if the hypervisor 210 is assigned the private IP address of 10.0.12.174/16 (i.e., 0x0A000CAE), the hypervisor 210 extracts the last 2 bytes, which are 0x0CAE, as the IP part. In certain embodiments, the hypervisor 210 can store the last 2 bytes of the IP address, i.e., the IP part, in a data module 219 of the hypervisor 210 or a remote server. Each time when the hypervisor 210 is constructing a MAC address, the hypervisor can retrieve the IP part from the data module 219.

The hypervisor 210 can employ the generation module 218 to a generate a unique byte, as a VNIC part of a MAC address, for each virtual network interface controller 252, 254, 256 provided by the one or more virtual machines 234, 236, 238 hosted by the hypervisor. In circumstances where each virtual machine only has one virtual network interface, the hypervisor can alternatively assigned a unique byte or a virtual machine ID to each virtual machine hosted by the hypervisor 210. In the example shown in FIG. 2, the hypervisor 210 hosts three virtual machines 252, 254, 256 each having a respective virtual network interface controller 252, 254, 256. The unique byte can be generated randomly or in a sequential order, or in accordance with any other predetermined rules known by one skilled in the art. In other words, the unique byte can uniquely identify a particular virtual network interface controller on the hypervisor 210. In certain embodiments, the hypervisor 210 can provides N VNICs across the one or more virtual machines, N being an integer greater than 2. In certain embodiments, the hypervisor 210 can save the N VNIC parts identified for the virtual network interface controllers in the data module 219 of the hypervisor 210 or the remote server. In circumstances where the MAC address for the same virtual network interface controller needs to be reconstructed and reassigned, the generation module 218 can optionally retrieve from the data module 219 the same VNIC part that was previously used for the same virtual network interface controller.

In certain embodiments, the generation module 219 uses an OUI part that is preset or preconfigured for the hypervisor. For example, the XEN hypervisor can use the OUI ("00:16:3E") assigned by IEEE. The hypervisor can retrieve the preconfigured OUI from the configuration of the hypervisor or a data server in the network.

The generation module 219 then construct a unique MAC address for a particular virtual network interface controller on the hypervisor. In a local network where more than one hypervisor exists, the hypervisors each need to follow a predetermined construction rule to combine the above described OUI part, the IP part, and the virtual NIC part to ensure uniqueness of the constructed MAC addresses. In certain embodiments, the construction rule is set as that the OUI part is followed by the IP address part, which is then followed by the virtual NIC part. For example, the generation module 218 can use the preset OUI (e.g. "00:16:3E") as the OUI part of the MAC address. The OUI is followed by the two bytes extracted from the IP address of the hypervisor. Finally, the ID or VNIC part of the virtual network interface controller is added. Suppose that the hypervisor has an IP address of 194.24.7.255/21, then a unique MAC address for a virtual network interface controller is constructed by combining the "00:16:3E" (i.e. the OUI), "07:FF" (i.e., the last two bytes of the IP address), and "01" (i.e., ID of the virtual network interface controller). The constructed MAC address is "00:16:3E:07:FF:01". In certain embodiments, the construction rule is set as that the OUI part is followed by the virtual NIC part, which is then followed by the IP part. Using the same example with this rule, the constructed MAC address is "00:16:3E:01:07:FF".

In certain embodiments, the hypervisor 210 can release its current IP address and obtain a new IP address, for example from the DHCP server. The generation module can optionally reconstruct an updated MAC addresses for each of or some of the virtual network interface controllers. For example, the hypervisor 210 can use the last 2 bytes of the new IP address as the updated IP part. The generation module 218 can retrieve the OUI part as well as the VNIC part for each of the virtual network interface controllers provided by the hypervisor 210. The generation module 218 then can construct an updated MAC address for each of the virtual network interface controllers by combining the OUI part, the updated IP part, and the VNIC part of that virtual network interface controller. Alternatively, the generation module 218 can generate a new VNIC part for each of or some of the virtual network interface controllers.

In certain embodiments, multiple hypervisors run on multiple computing devices in the local network. Each hypervisor is assigned, for example by a DHCP server, a unique IP address within the network. Similar to the description above, each hypervisor can share the same preconfigured OUI part, use the last 2 bytes of its own IP address as the IP part, and generate VNIC parts that are unique to each other within each hypervisor.

Figure 3:
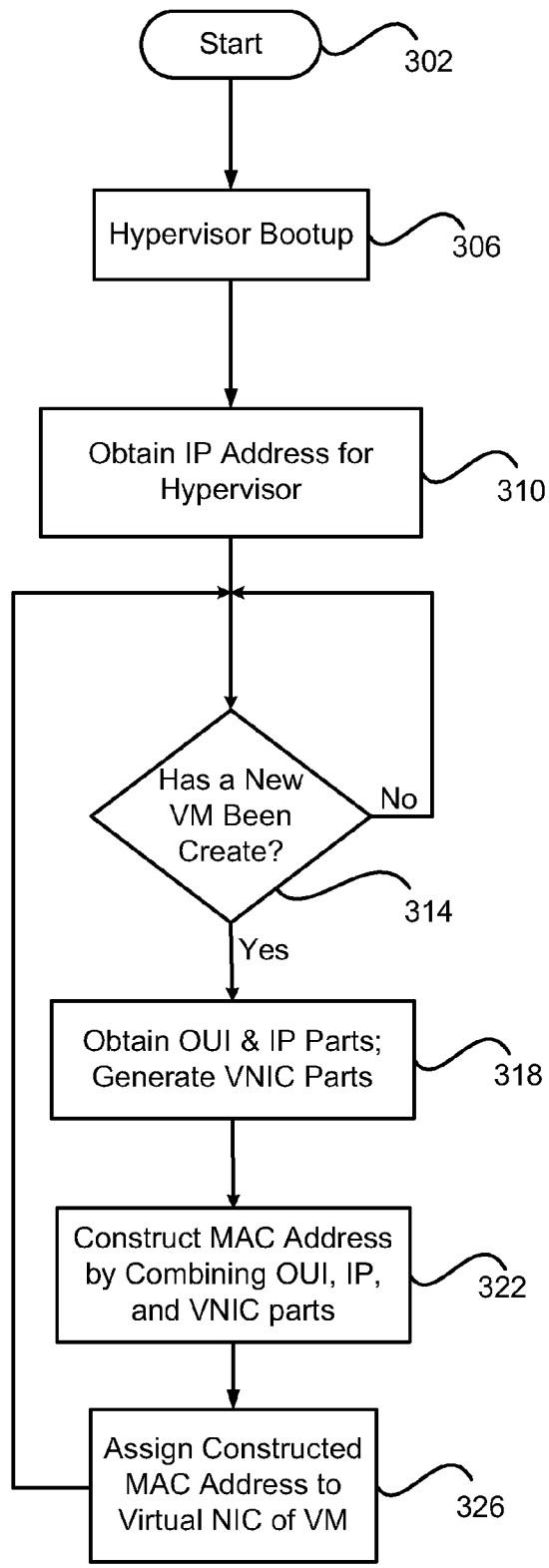
FIG. 3 is a flowchart illustrating a process of a hypervisor for generating a unique MAC address in accordance with certain embodiments of the present disclosure.

FIG. 3 is a flowchart illustrating a process of the hypervisor for generating a unique MAC address in accordance with certain embodiments of the present disclosure. The process starts at operation 302. At operation 306, the hypervisor 210 boots up. At operation 310, the hypervisor 210 sends the MAC address of the physical network controller 207 to a DHCP server in the network. The hypervisor 210 receives an IP address assigned by the DHCP server to the physical network interface controller 207. After receiving the IP address, control of the hypervisor can optionally determine whether length of the prefix of the IP address is 16 or greater, and only proceeds to operation 314 in response to a determination that the length of the prefix is 16 or greater. At operation 314, control of the hypervisor determines whether a new virtual machine or guest domain has been created with a virtual network interface controller. If no, control reenters operation 314 and repeats the operation until it determines that a new virtual machine or guest domain has been created. If yes, control enters operation 318, where control instructs the generation module 218 to generate a virtual NIC part (i.e., one byte). Further, control obtains the preconfigured OUI part as well as instructs the extraction module 217 to extract the IP part from the IP address of the hypervisor 210. Then, in this example, at operation 322 control combines the OUI part, the IP part, and the virtual NIC part to construct a unique MAC address in the local network. At operation 326, control assigns the constructed unique MAC address to the virtual network interface controller of the VM that has not been assigned a MAC address.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A computing device, comprising:
    A hypervisor running on a processor, the hypervisor being assigned a first Internet Protocol (IP) address, the hypervisor hosting a first virtual machine (VM) having a first virtual network interface controller (VNIC),
    wherein the hypervisor is configured to
        obtain an OUI part, the OUI part being a organizationally unique identifier (OUI) preconfigured for the hypervisor,
        obtain an IP part, the IP part being the last two bytes of the first IP address,
        obtain a first VNIC part, the first VNIC part being a byte generated for the first VNIC,
        construct a first MAC address by combing the OUI part, the IP part, and the first VNIC part, and
        assign the first Media Access Control (MAC) address to the first VNIC.

2. The computing device of claim 1, wherein the hypervisor hosts a second virtual machine having a second VNIC, and wherein the hypervisor is configured to
    obtain a second VNIC part, the second VNIC part being a byte generated for the second VNIC and different from the first VNIC part,
    construct a second MAC address by combing the OUI part, the IP part, and the second VNIC part, and
    assign the second MAC address to the second VNIC.

3. The computing device of claim 1, wherein the hypervisor provides N VNICs, N being an integer greater than 2, and wherein the hypervisor is configure to
    generate N VNIC parts that each are a single byte and that are unique to each other,
    construct N MAC addresses, each of the N MAC address being a combination of the OUI part, the IP part, and a respective, different one of the N VNIC parts, and
    assign each of the N MAC addresses to a respective, different one of the N VNICs.

4. The computing device of claim 1, wherein the hypervisor is configured to
    determine whether the prefix length of the first IP address is 16 or greater, and
    obtain the IP part in response to a determination that the prefix length of the IP address is 16 or greater.

5. The computing device of claim 4, wherein the hypervisor is configured to store the IP part in a data module.

6. The computing device of claim 1, wherein the hypervisor is configured to obtain the first IP address from a DHCP server.

7. The computing device of claim 6, wherein the hypervisor is configured to
    release the first IP address and obtain a second IP address from a DHCP server,
    obtain an updated IP part, the updated IP part being the last two bytes of the second IP address, construct an updated first MAC address by combing the OUI part, the updated IP part, and the first VNIC part, and assign the updated first MAC address to the first VNIC.

8. The computing device of claim 1, wherein the hypervisor is configured to determine, prior to constructing the first MAC address, whether the first VM has been created.

9. The computing device of claim 8, wherein the hypervisor is configured to determine whether another VM that has not been provided a MAC address has been created, construct another MAC address by combing the OUI part, the IP part, and another VNIC part, the another VNIC part being a byte uniquely generated, and assign the another MAC address to a VNIC of the another VM.

10. A method for dynamically assigning Media Access Control (MAC) addresses to virtual network interface controllers (VNICs) of a hypervisor running on a VNIC computing device having a processor, the hypervisor hosting a first virtual machine having a first VNIC, the hypervisor being assigned a first Internet Protocol (IP) address, the method comprising:

obtaining an OUI part, at the hypervisor executed by the processer, wherein the OUI part is a organizationally unique identifier (OUI) preconfigured for the hypervisor;

obtaining an IP part, the IP part being the last two bytes of the first IP address;

obtaining a first VNIC part, the VNIC part being a byte generated for the first VNIC;

constructing a first MAC address by combing the OUI part, the IP part, and the first VNIC part; and assigning the first MAC address to the first VNIC.

11. The method of claim 10, wherein the hypervisor hosts a second virtual machine having a second VNIC, wherein the method comprises:

obtaining a second VNIC part, the second VNIC part being a byte generated for the second VNIC and different from the first VNIC part;

constructing a second MAC address by combing the OUI part, the IP part, and the second VNIC part; and assigning the second MAC address to the second VNIC.

12. The method of claim 10, wherein the hypervisor provides N VNICs, N being an integer greater than 2, and wherein the method comprises:

generating N VNIC parts that each are a single byte and that are unique to each other;

constructing N MAC addresses, wherein each of the N MAC address is a combination of the OUI part, the IP part, and a respective, different one of the N VNIC parts; and assigning each of the N MAC addresses to a respective, different one of the N VNICs.

13. The method of claim 10, comprising:

determining whether the prefix length of the IP address is 16 or greater; and obtaining the IP part in response to a determination that the prefix length of the IP address is 16 or greater.

14. The method of claim 13, further comprising storing the IP part in a data module.

15. The method of claim 10, further comprising obtaining the first IP address from a DHCP server.

16. The method of claim 10, further comprising:

releasing the first IP address and obtaining a second IP address from a DHCP server;

obtaining an updated IP part, the updated IP part being the last two bytes of the second IP address;

constructing an updated first MAC address by combing the OUI part, the updated IP part, and the first VNIC part; and assigning the updated first MAC address to the first VNIC.

17. The method of claim 10, further comprising determining, prior to constructing the first MAC address, whether the first VM has been created.

18. The method of claim 17, further comprising:

determining whether another VM that has not been provided a MAC address has been created;

constructing another MAC address by combing the OUI part, the IP part, and another VNIC part, the another VNIC part being a byte uniquely generated; and assigning the another MAC address to a VNIC of the another VM.

19. A non-transitory computer readable medium storing instructions, when executed, causing a computing device to execute a Media Access Control (MAC) address assignment process, a hypervisor running on the computing device, the hypervisor hosting a first virtual machine having a first virtual network interface controller (VNIC), the hypervisor being assigned a first Internet Protocol (IP) address, the instructions comprising:

obtaining an OUI part, at the hypervisor executed by a processor, wherein the OUI part is a organizationally unique identifier (OUI) preconfigured for the hypervisor;

obtaining an IP part, the IP part being the last two bytes of the first IP address;

obtaining a first VNIC part, the VNIC part being a byte generated for the first VNIC;

constructing a first MAC address by combing the OUI part, the IP part, and the first VNIC part; and assigning the first MAC address to the first VNIC.

20. The non-transitory computer readable medium of claim 19, wherein the hypervisor hosts a second virtual machine having a second VNIC, and wherein the instructions comprise:

obtaining a second VNIC part, the second VNIC part being a byte generated for the second virtual NIC and different from the first VNIC part, constructing a second MAC address by combing the OUI part, the IP part, and the second VNIC part, and assigning the second MAC address to the second virtual NIC.

21. The non-transitory computer readable medium of claim 19, wherein the hypervisor provides N VNICs, N being an integer greater than 2, and wherein the instructions comprise:

generating N VNIC parts that each are a single byte and that are unique to each other;

constructing N MAC addresses, wherein each of the N MAC address is a combination of the OUI part, the IP part, and a respective, different one of the N VNIC parts; and assigning each of the N MAC addresses to a respective, different one of the N VNICs.

22. The non-transitory computer readable medium of claim 19, wherein the instructions comprise:

determining whether the prefix length of the IP address is 16 or greater; and obtaining the IP part in response to a determination that the prefix length of the IP address is 16 or greater.

23. The non-transitory computer readable medium of claim 22, wherein the instructions further comprise storing the IP part in a data module.

24. The non-transitory computer readable medium of claim 19, wherein the instructions further comprise obtaining the first IP address from a DHCP server.

25. The non-transitory computer readable medium of claim 24, wherein the instructions further comprise:
  releasing the first IP address and obtaining a second IP address from a DHCP server;
  obtaining an updated IP part, the updated IP part being the last two bytes of the second IP address;
  constructing an updated first MAC address by combing the OUI part, the updated IP part, and the first VNIC part; and
  assigning the updated first MAC address to the first VNIC.

26. The non-transitory computer readable medium of claim 19, wherein the instructions further comprise determining, prior to constructing the first MAC address, whether the first VM has been created.

27. The non-transitory computer readable medium of claim 26, wherein the instructions further comprise:
  determining whether another VM that has not been provided a MAC address has been created;
  constructing another MAC address by combing the OUI part, the IP part, and another VNIC part, the another VNIC part being a byte uniquely generated; and assigning the another MAC address to a VNIC of the another VM.

* * * * *